(12) United States Patent
Lee (10) Patent No.: US 11,529,217 B2
(45) Date of Patent: Dec. 20, 2022

(54) DENTAL IMPLANT (71) Applicant: Jae-joon Lee

(72) Inventor: Jae-joon Lee, Chungcheongnam-do (KR)

(*) Notice: Subject to any disclaimer, the term of this patent is extended or adjusted under 35 U.S.C. 154(b) by 214 days.

(21) Appl. No.: 16/956,732

(22) PCT Filed: Dec. 27, 2018

(86) PCT No.: PCT/KR2018/016697
§ 371 (c)(1),
(2) Date: Jun. 22, 2020

(87) PCT Pub. No.: WO2019/132529
PCT Pub. Date: Jul. 4, 2019

(65) Prior Publication Data
US 2020/0337812 A1 Oct. 29, 2020

(30) Foreign Application Priority Data

Dec. 27, 2017 (KR) .................. 10-2017-0180536

(51) Int. Cl.
*A61C 8/00* (2006.01)
(52) U.S. Cl.
CPC .......... *A61C 8/0028* (2013.01); *A61C 8/0042* (2013.01)
(58) Field of Classification Search
CPC ..................... A61C 8/0059; A61C 8/0068
See application file for complete search history.

(56) References Cited

U.S. PATENT DOCUMENTS

| 2,591,451 | A | * | 4/1952 | Lynch | ..................... | A61C 3/16 |
| | | | | | | 433/152 |
| 3,747,215 | A | * | 7/1973 | Joyner, Jr. | ............... | A61C 5/70 |
| | | | | | | 433/219 |
| 4,854,872 | A | * | 8/1989 | Detsch | ................. | A61C 8/0066 |
| | | | | | | 433/173 |

(Continued)

FOREIGN PATENT DOCUMENTS

| JP | 2016-531643 A | 10/2016 |
| KR | 10-2008-0112896 A | 12/2008 |

(Continued)

OTHER PUBLICATIONS

International Search Report for PCT/KR2018/016697 dated Mar. 29, 2019.

*Primary Examiner* — Ralph A Lewis
(74) *Attorney, Agent, or Firm* — The PL Law Group, PLLC (57) ABSTRACT

A dental implant includes a fixture implanted into an alveolar bone, an abutment fixed to an upper part of the fixture and having a core hole formed in a center of an upper surface of the abutment, a crown bonded to an upper outer side of the abutment and having a passage vertically formed through a center of the crown, and a cover screw having a screw screw-fastened to the core hole and a head in close contact between an upper surface of the abutment and a lower surface of the crow to cover the core hole, in which, when the screw is released by a tool passing through the passage, the head moves up so that the cover screw provides a separating force to the crown. The dental implant may facilitate a separation of the crown and prevent binding force from weakening, thereby enabling an efficient procedure and management.

2 Claims, 6 Drawing Sheets (56) References Cited

U.S. PATENT DOCUMENTS

| | | | | |
|---|---|---|---|---|
| 5,733,122 A * | 3/1998 | Gordon | ............... | A61C 8/005 |
| | | | | 433/172 |
| 5,947,733 A * | 9/1999 | Sutter | ............... | A61C 8/005 |
| | | | | 433/173 |
| 6,155,829 A * | 12/2000 | Maino | ............... | A61C 8/0068 |
| | | | | 433/7 |
| 2006/0141418 A1* | 6/2006 | Heo | ............... | A61C 8/005 |
| | | | | 433/173 |
| 2011/0053114 A1* | 3/2011 | Shimoda | ............... | A61F 2/18 |
| | | | | 623/4.1 |
| 2016/0242877 A1* | 8/2016 | Bernhard | ............... | A61C 13/0018 |
| 2019/0175310 A1* | 6/2019 | Zipprich | ............... | A61C 8/0068 |
| 2019/0223987 A1* | 7/2019 | Doswell | ............... | A61C 8/0089 |
| 2019/0350683 A1* | 11/2019 | Kenealy | ............... | A61C 9/0046 |
| 2020/0337812 A1* | 10/2020 | Lee | ............... | A61C 8/0028 |

FOREIGN PATENT DOCUMENTS

| | | |
|---|---|---|
| KR | 10-1573520 B1 | 12/2015 |
| KR | 10-2016-0057868 A | 5/2016 |
| WO | WO 01/08589 A1 | 2/2001 |

* cited by examiner

DENTAL IMPLANT

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2018/016697 filed on Dec. 27, 2018, which claims priority to the benefit of Korean Patent Application No. 10-2017-0180536 filed in the Korean Intellectual Property Office on Dec. 27, 2017, the entire contents of which are incorporated herein by reference.

TECHNICAL FIELD

The present invention relates to a dental implant, and more particularly to a dental implant for facilitating a separation of a crown and preventing a binding force from weakening.

BACKGROUND ART

An implant means a substitute that restores a lost human tissue. In particular, a dental implant means a substitute capable of functioning as a tooth, in such a way that a fixture, which is an artificial dental root, is implanted into and adheres to an alveolar bone, from which a natural dental root is taken out, in order to replace a dental root of a lost tooth, and a crown, which is an artificial tooth, is fixed to the fixture.

The dental implant conventionally includes a fixture which is osseointegrated into an alveolar bone to perform a dental root function, an abutment fixed to the fixture, and a crown fixed to the abutment to carry out a tooth function.

However, with regard to the conventional dental implant, the crown is fixedly bonded to the abutment. However, when the dental implant requires management such as replacement of the crown, etc., it is difficult to separate and remove the crown, thus causing inconvenience to operators and patients.

Further, as cotton, etc., is filled into an inner passage of the abutment, which is used for fastening the abutment to the fixture, smell such as odor, etc., occurs as time passes after a procedure, thus causing a problem of giving discomfort to patients. In addition, a lateral force is applied in a process of chewing food, so that a screw-coupling force of the abutment screw-coupled to the fixture becomes loose, thus having a problem of causing complications such as screw breakage, loss of masticatory function, etc.

SUMMARY

An object of the present invention is to provide a dental implant capable of facilitating a simple separation and removal of a crown from an abutment, minimizing occurrence of bad smell, etc., and restraining a fixture and the abutment from being released, thereby maintaining a binding force for a long time.

To achieve the object, the present invention discloses a dental implant including a fixture implanted into an alveolar bone, an abutment fixed to an upper part of the fixture and having a core hole downwardly formed with a predetermined depth in a center of an upper surface of the abutment, a crown fixedly bonded to an upper outer side of the abutment and having a passage vertically formed through a center of the crown, and a cover screw having a screw portion screw-fastened to the core hole and a head portion which comes in close contact between an upper surface of the abutment and a lower surface of the crown, which face each other, to cover the core hole, in which, when the screw portion is released by a tool passing through the passage, the head portion moves up so that the cover screw provides a separating force to the crown.

According to the present invention, a dental implant has advantages of facilitating a simple separation of a crown through a cover screw coupled to an abutment and minimizing occurrence of bad smell, etc., thereby enabling a more efficient management and maintenance of the implant.

In addition, the dental implant may maintain a binding force between the fixture and the abutment through an anti-release member, thus having an advantage of solving problems such as breakage, loss of masticatory function, etc., due to the weakened binding force.

DETAILED DESCRIPTION

Hereinafter, preferred embodiments of a dental implant according to the present invention will be described in detail with reference to the accompanying drawings. These embodiments are provided to more fully explain the present invention to those of ordinary skill in the art, and it should be noted that a shape and size of elements, an interval between the elements and the like in the accompanying drawings may be reduced or exaggerated to emphasize a clearer description.

FIGS. 1 to 6 show examples of a configuration and operation of a dental implant according to one embodiment of the present invention. Thus, referring to the drawings, the dental implant (hereinafter referred to as "implant 100") may first include a fixture 10, an abutment 20 and a crown 30 as a basic configuration.

Figure 1:
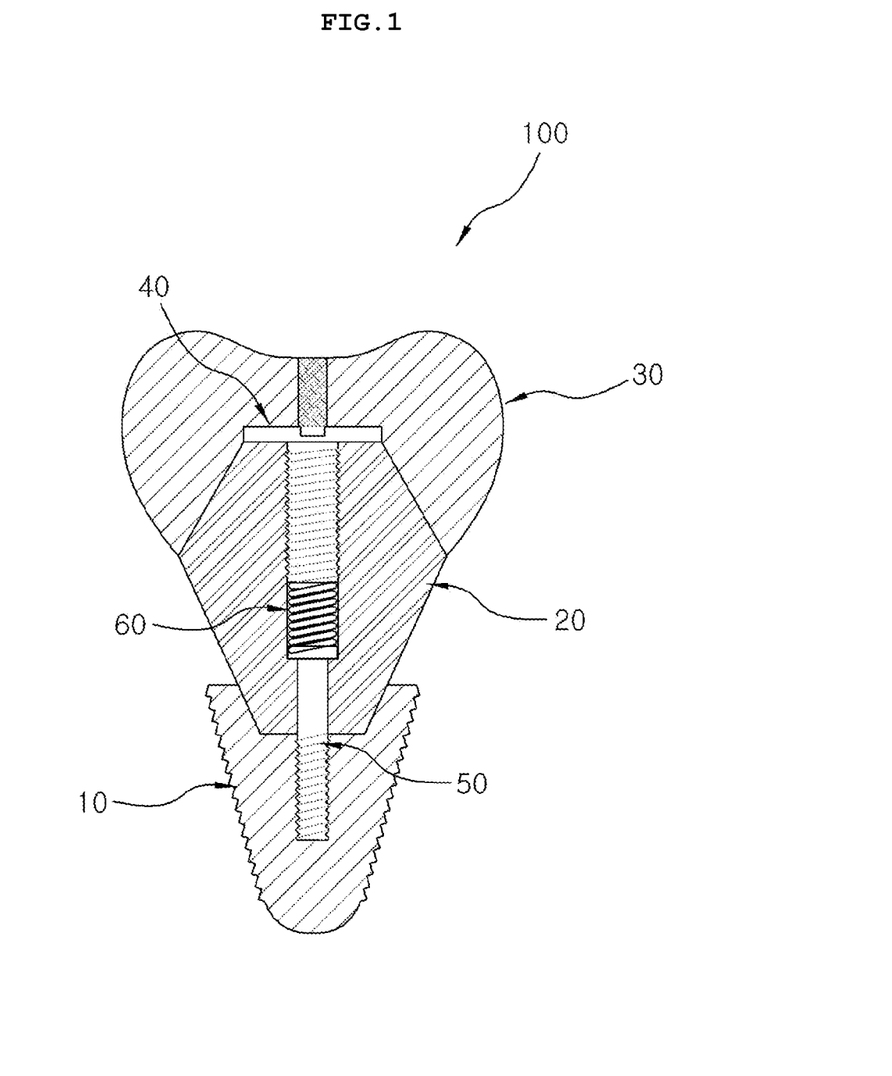
FIG. 1 is a view showing one example of an entire configuration of a dental implant according to the present invention.
Figure 2:
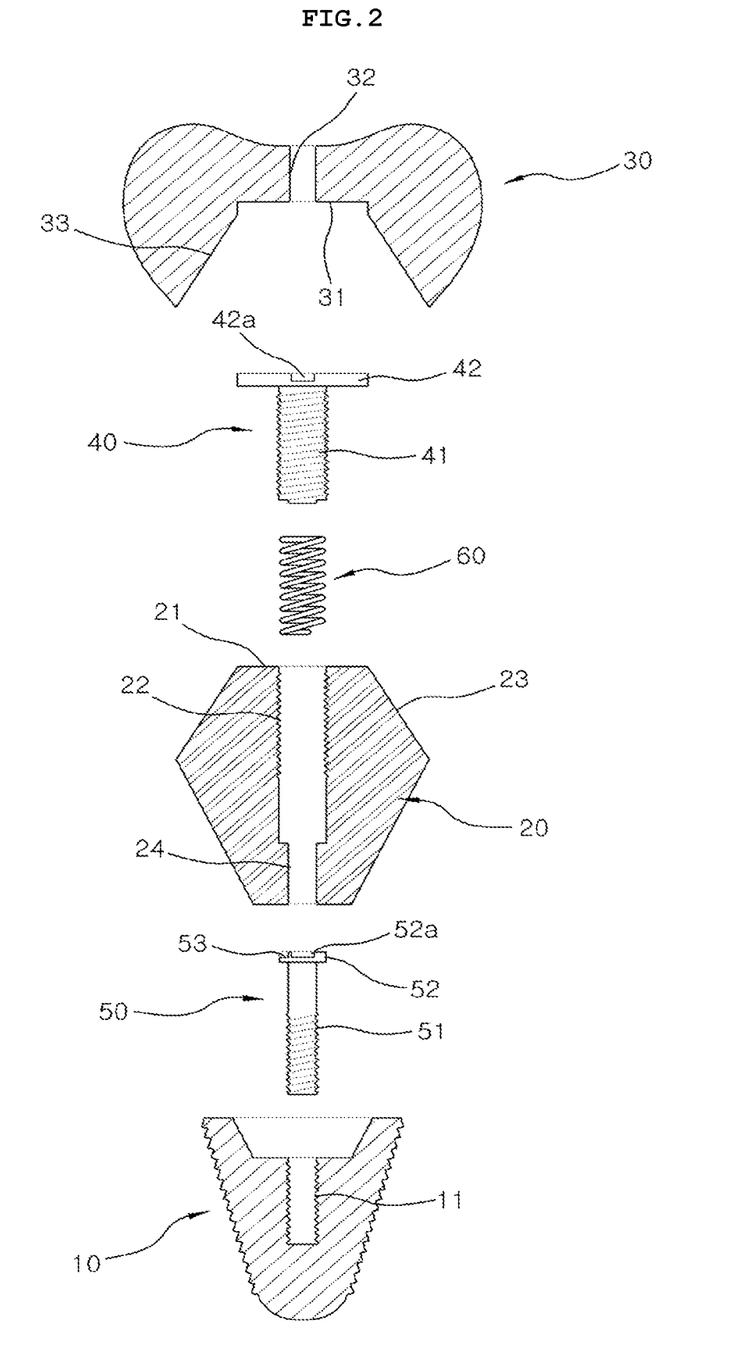
FIG. 2 is a view showing one example of the entire configuration of FIG. 1 for each element.

The fixture 10 may be implanted into an alveolar bone to serve as a dental root for fixing the implant 100 as a whole.

The fixture 10 may have a screw thread formed on an outer circumferential surface so that the fixture may be implanted into the alveolar bone, and may be made of a material with excellent biocompatibility for easy adhesion with human bone tissues. As one example, the fixture may be made of titanium.

The abutment 20 may serve as a support in such a way that the abutment 20 is fixed to an upper part of the fixture 10 and the crown 30 is fixed to an upper outer side of the abutment 20, so that the abutment 20 may play a role as a structural interface between the fixture 10 and the crown 30.

The fixture 10 and the abutment 20 may be formed as a two-piece type in which the fixture 10 and the abutment 20 are made of elements independent from each other and thus fixedly coupled to each other through mutual fastening as shown in the drawings as an example. On the contrary, the fixture 10 and the abutment 20 may be formed as a one-piece type in which the fixture 10 and the abutment 20 are integrated into one and fixed to each other.

In this regard, for convenience this embodiment will be described based on the two-piece type in which the fixture 10 and the abutment 20 are made of elements independent from each other and thus fixedly coupled to each other through mutual fastening, but is not limited thereto. Of course, however, it may be also necessary to consider the one-piece type in which the fixture 10 and the abutment 20 are integrated into one and fixed to each other.

The crown 30 may be an artificial tooth or a dental prosthesis that takes charge of mastication, which is a basic function of teeth.

The crown 30 may be made of ceramic, gold, etc., and may be fixed to an upper outer side of the abutment 20 with adhesives, for one example, through bonding with cement.

According to the present invention, a basic configuration of the implant as above may further include a cover screw 40.

As shown in FIG. 2 as one example, the cover screw 40 may be fastened and coupled to the abutment 20 before the crown 30 is fixedly bonded to the abutment 20, and the cover screw 40 may include a screw portion 41 with a predetermined length having a male thread formed on an outer circumferential surface of the screw portion 41 and a head portion 42 formed at an upper part of the screw portion 41.

The head portion 42 may have a tool recess 42a formed in a center of an upper surface of the head portion 42 so that a tool T such as a driver, a wrench, etc., may be fitted with the head portion 42 to receive a torque for fastening and releasing.

For fastening and releasing of the cover screw 40, an upper surface 21 may be formed in a flat shape at the abutment and a core hole 22 may be downwardly formed with a predetermined depth in a center of the upper surface 21 of the abutment 20.

A female thread corresponding to the male thread of the screw portion 41 may be formed on an inner surface of the core hole 22 in order to screw-fasten the screw portion 41 of the cover screw 40.

And, an outer inclined surface 23, which is formed to be downwardly inclined to an outer side along an outer surface from the upper surface 21, may be formed at the abutment 20.

Further, a lower surface 31 corresponding to the upper surface 21 of the abutment 20 may be formed in a flat shape at the crown 30 and a passage 32, which vertically passes, may be formed in a center of the crown 30. The passage 32 may serve as a path through which a tool (T) such as a driver, a wrench, etc., may pass.

And, an inner inclined surface 33, which corresponds to the outer inclined surface 23 of the abutment 20 and thus is formed to be downwardly inclined to an outer side along an inner surface from the lower surface 31, may be formed at the crown 30.

According to the above configuration, the cover screw 40 may be first fastened and coupled to the abutment 20 in such a way that the screw portion 41 is inserted into and screw-fastened to the core hole 22 before fixing the crown 30. Upon the coupling, the head portion 42 of the cover screw 40 may come in close contact with an upper surface 21 of the abutment 20 to close the core hole 22.

Then, when the crown 30 is fixedly bonded to an outer side of the abutment 20 so that the upper surface 21 and the outer inclined surface 23 of the abutment 20 as well as the lower surface 31 and the inner inclined surface 33 of the crown 30 may face each other, the head portion 42 of the cover screw 40 may be positioned to come in close contact between the upper surface 21 of the abutment 20 and the lower surface 31 of the crown 30, which face each other, as shown in FIG. 1 as one example.

In the case of the cover screw 40, in which the head portion 42 of the cover screw 40 is positioned between the abutment 20 and the crown 30 as the cover screw 40 is coupled to the abutment 20, when the screw portion 41 is released by the tool (T) during replacement of the crown 30, the head portion 42 may move up from the upper surface 21 of the abutment 20 to perform a function of providing a separating force for separating the crown 30 from the abutment 20 such that the crown 30 may be spaced apart from the abutment 20.

On the other hand, in case of the two-piece type, in which the fixture 10 and the abutment 20 are made of elements independent from each other and thus fixedly coupled to each other through mutual fastening, the implant 100 of the present invention may further include a fastening screw 50 and an anti-release member 60 in particular.

The fastening screw 50 may be used to fasten and fix the abutment 20 to the fixture 10. As shown in FIG. 2 as one example, the fastening screw 50 may include a screw portion 51 with a predetermined length having a male thread formed on an outer circumferential surface of the screw portion 51 and a head portion 52 formed at an upper part of the screw portion 51, and the head portion 52 may have a tool recess 52a formed in a center of an upper surface of the head portion 52 so that a tool may be fitted with the head portion 52 to receive a torque for fastening and releasing.

For coupling between the abutment 20 and the fixture 10 through the fastening screw 50, a fastening hole 11 may be downwardly formed with a predetermined depth in a center of an upper surface of the fixture 10 and a female thread may be formed on an inner surface of the fastening hole 11 for fastening the screw portion 51.

Further, a through-hole 24 may be formed at a lower end of the core hole 22 of the abutment 20 so that the screw portion 51 of the fastening screw 50 may pass through the core hole 22.

According to the above configuration, the fastening screw 50 may be led into the core hole 22 of the abutment 20 and screw-fastened into the fastening hole 11 of the fixture 10 through the through-hole 24, thereby fixedly coupling the abutment (20) to the fixture (10).

The anti-release member 60 may be provided in the core hole 22 between the cover screw 40 and the fastening screw 50 to restrain the fastening screw 50 from being released.

As disclosed above, the fastening screw 50 for fixing the fixture 10 and the abutment 20 may be gradually released while rotating as a lateral pressure is repeatedly applied thereto with masticatory activities performed after a procedure. Thus, the anti-release member 60 may play a role of suppressing the fastening screw 50 such that the fastening screw 50 can be prevented from being released while rotating by the lateral pressure.

Figure 3:
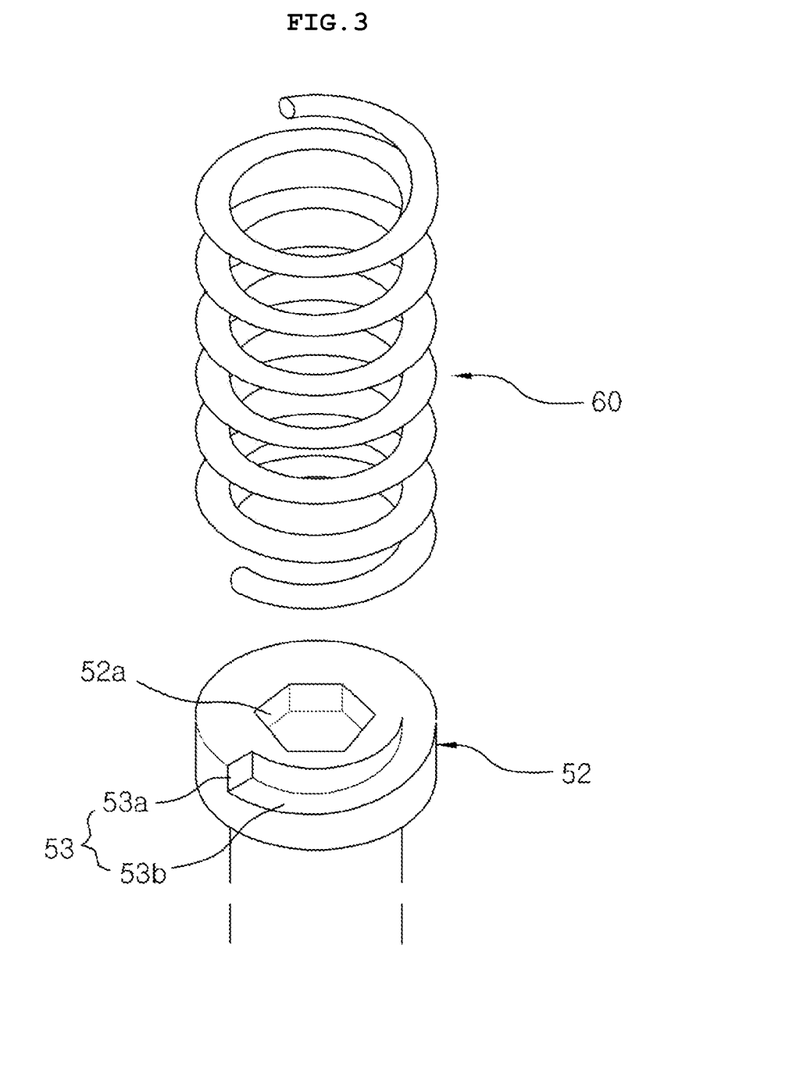
FIGS. 3 and 4 are views showing examples of a fastening screw and an anti-release member according to the present invention.
Figure 4:
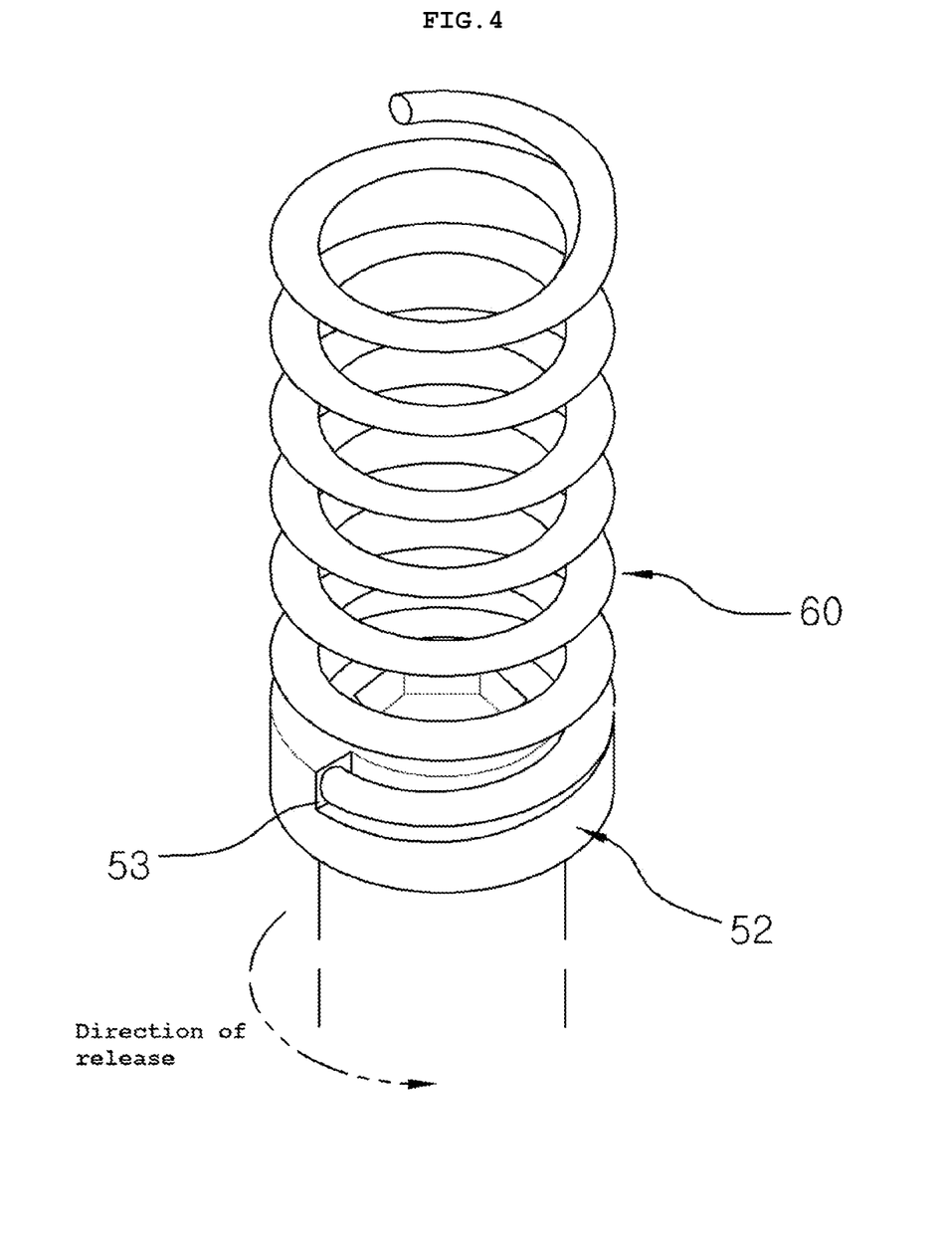

For restraining the release of the fastening screw 50, as shown in FIGS. 3 and 4 as one example, a latching step 53 may be formed along a circumference on an upper surface of the head portion 52 of the fastening screw 50, and the anti-release member 60 may be made of an elastic spring in which an end portion of a lower side of the anti-release member 60 is fitted with the latching step 53 to restrain the fastening screw 50 from rotating in a direction of release.

As shown in FIG. 3 as one example, the latching step 53 may include a latching protrusion 53a which is vertically recessed with a predetermined depth from an upper surface of the head portion 52 to latch an end portion of the anti-release member 60, and an inclined plane 53b which extends to gently ascend from the latching protrusion 53a in a direction of release to naturally fit a lower side of the anti-release member 60.

According to the above configuration, while the fastening screw 50 is fastened, the anti-release member 60 may be led into the core hole 22, and an end portion of a lower side of the anti-release member 60 is fitted with the latching step 52 as shown in FIG. 4 as one example. After that, when the cover screw 40 is fastened to an upper side of the anti-release member 60, the anti-release member 60 may be downwardly pressurized and compressed by the cover screw 40 to restrain the fastening screw 50 from rotating in a direction of release while maintaining a firmly fixed state between the cover screw 40 and the fastening screw 50.

Hereinafter, an installation process and an operation of the implant 100 according to the present invention will be briefly described. For convenience sake, the implant 100 which is only a two-piece type of having the fixture 10 and the abutment 20 independent from each other will be described as an example.

First of all, the fixture 10 which forms the implant 100 may be implanted into an alveolar bone.

After that, once osseointegration of the fixture 10 is confirmed, the fastening screw 50 may be led into the core hole 22 of the abutment 20 to be screw-fastened to the fastening hole 11 of the fixture 10, thereby fixedly coupling the abutment 20 to an upper part of the fixture 10.

Then, the anti-release member 60 may be led into the core hole 22 of the abutment 20, so that an end portion of a lower side of the anti-release member 60 may be fitted with the latching step 53 of the fastening screw 50.

After that, the cover screw 40 may be inserted into the core hole 22 of the abutment 20 to be fixedly fastened to the core hole 22. In this case, as the cover screw 40 is fastened, the anti-release member 60 may be pressurized and compressed to be fixed to the core hole 22. Once fastening is completed, the head portion 42 of the cover screw 40 may come into close contact with the upper surface 21 of the abutment 20 to close the core hole 22.

As above, after the cover screw 40 is completely fastened and fixed, the crown 30 may be fixedly bonded to an outer side of the abutment 20. When the crown 30 is fixed thereto, the passage 32 of the crown 30 may be filled with resin, etc., to close the passage 32, thereby completing an installation process.

If the installation is completed as above, the fastening screw 50 may be restrained from being released by the anti-release member 60, even though a lateral pressure is applied in a process of chewing food, thus causing no problem of breakage or weakened binding force between the fixture 10 and the abutment 20.

Further, the core hole 22 may be covered by the cover screw 40, thus minimizing occurrence of bad smell, etc. compared to a conventional structure filled with cotton, etc.

Meanwhile, discoloration, damage, etc., may occur to the crown 30, as time goes by after the installation. Thus, it is necessary to carry out a periodical management, and in severe cases, replace the crown 30.

Figure 5:
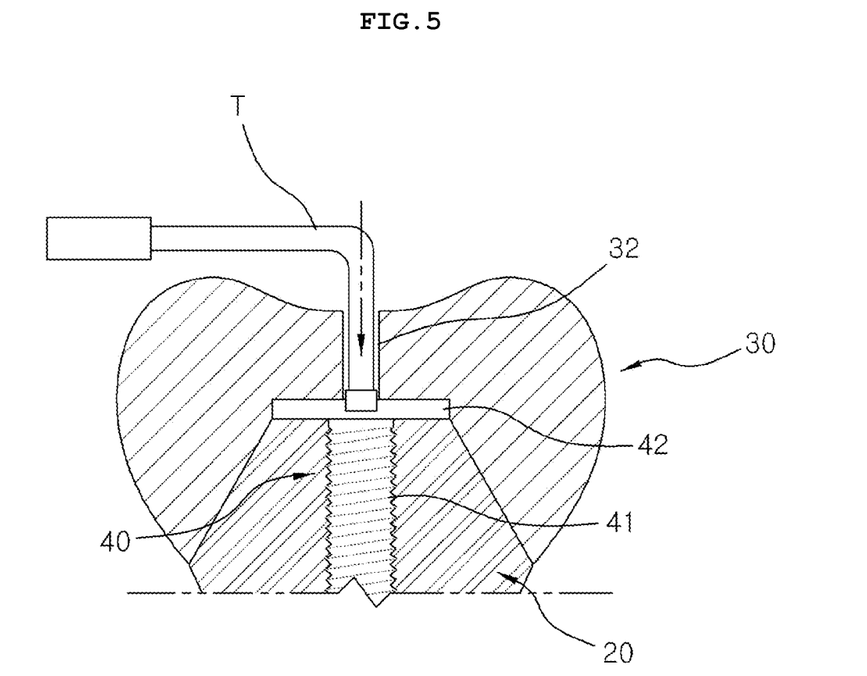
FIG. 5 is a view showing one example in which a tool is led into a crown through a passage of the crown according to the present invention.

Thus, if it is necessary to replace the crown 30, the implant 100 of the present invention may be treated in such a way that resin filled in the passage 32 of the crown 30 is removed to open the passage 32, after which a tool (T) is inserted through the opened passage 32 to release the cover screw 40 as shown in FIG. 5 as one example.

Figure 6:
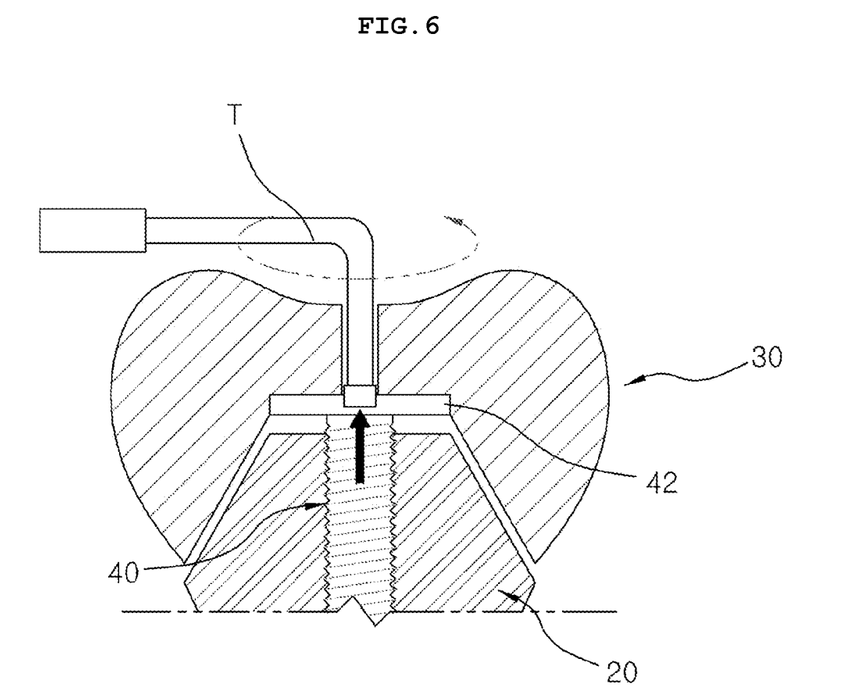
FIG. 6 is a view showing one example in which a crown is separated through a release of a cover screw according to the present invention.

Thus, as shown in FIG. 6 as one example, the head portion 42 of the cover screw 40 may be moved up and spaced apart from the upper surface 21 of the abutment 20, so that a bonding surface of the crown 30 may break away from a bonding surface of the abutment 20, thereby easily and simply separating and removing the crown 30 from the abutment 20.

As above, the present invention may provide a dental implant which may facilitate a simple separation of a crown, if necessary, while minimizing occurrence of bad smell, etc., through a cover screw, thereby enabling a more efficient management and maintenance of the implant. In addition, the dental implant may maintain a binding force between a fixture and an abutment through an anti-release member, thus solving problems caused by the weakened binding force.

The invention claimed is:

1. A dental implant comprising:
a fixture configured to be implanted into an alveolar bone;
an abutment fixed to an upper part of the fixture and having a core hole downwardly formed with a predetermined depth in a center of an upper surface of the abutment;
a crown fixedly bonded to an upper outer side of the abutment and having a passage vertically formed through a center of the crown;
a cover screw having a screw portion screw-fastened to the core hole and a head portion which comes in close contact between an upper surface of the abutment and a lower surface of the crown, which face each other, to cover the core hole, in which, when the screw portion is released by a tool passing through the passage, the head portion moves up so that the cover screw provides a separating force to the crown;
a fastening screw which is led into the core hole, and screw-fastened into a fastening hole of the fixture through a through-hole formed in a lower end of the core hole, thereby fixedly coupling the abutment to the fixture; and
an anti-release member provided in the core hole between the cover screw and the fastening screw to prevent the fastening screw from being released.

2. The dental implant of claim 1, wherein a latching step is formed on a head portion of the fastening screw along a circumference of an upper surface of the head portion, and the anti-release member comprises an elastic spring which is downwardly pressurized and compressed as the cover screw is fastened, so that an end portion of a lower side of the elastic spring is fitted with the latching step.

* * * * *